United States Patent Office 3,834,980
Patented Sept. 10, 1974

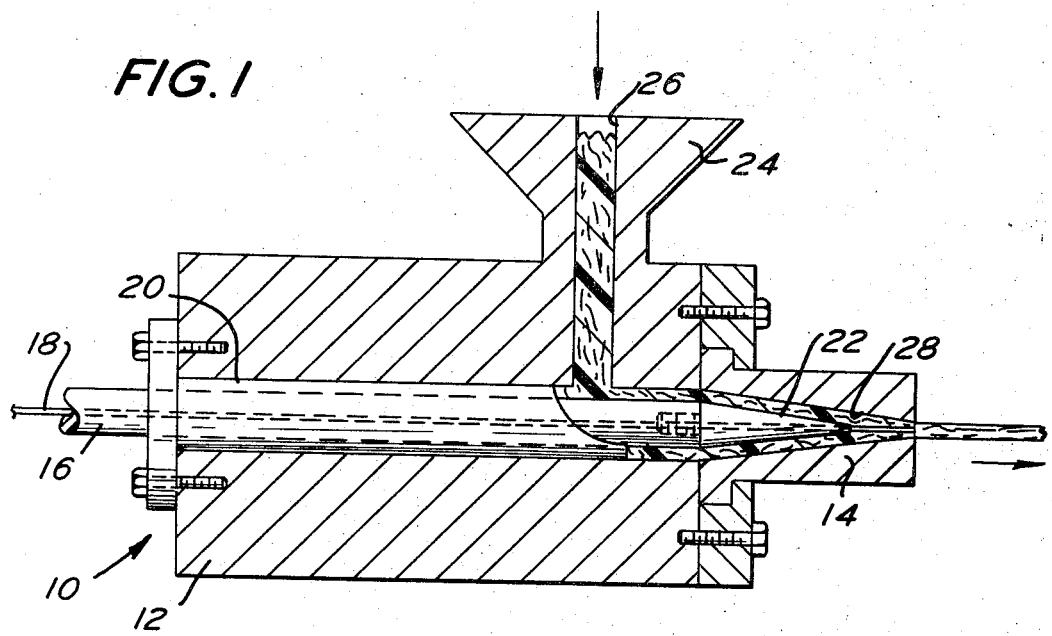
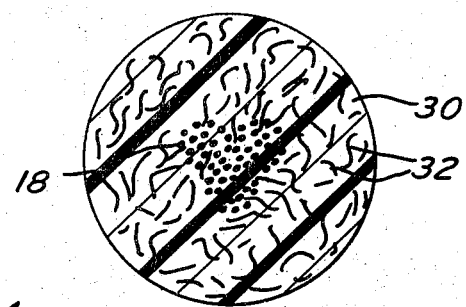
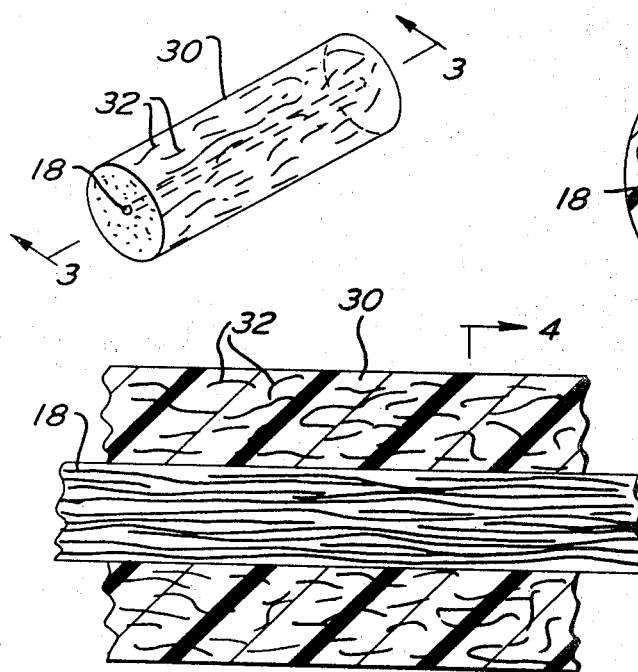
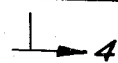

3,834,980
GLASS-FILLED THERMOPLASTIC PELLETS SUITABLE FOR BLENDING WITH THERMOPLASTIC
Norman T. Hall, Santa Ana, Calif., assignor to Liquid Nitrogen Processing Corporation, Malvern, Pa.
Application Mar. 27, 1970, Ser. No. 23,213, now Patent No. 3,702,356, which is a continuation-in-part of application Ser. No. 833,983, June 17, 1969, now Patent No. 3,608,033. Divided and this application July 19, 1972, Ser. No. 273,068
The portion of the term of the patent subsequent to Jan. 9, 1990, has been disclaimed
Int. Cl. B32b 5/02
U.S. Cl. 161—176　　　　　　　　　　　　　　　　1 Claim

ABSTRACT OF THE DISCLOSURE

The process consists of feeding an extruded mixture of silane coupling agent, and molten thermoplastic (with or without glass fibers) to a cross-head die, coating continuous glass roving with said mixture in said cross-head die, solidifying said molten thermoplastic while said thermoplastic is coated on said roving, and pelletizing the solidified material. Such pellets may be blended with thermoplastic, and thereafter molded to yield an article having high tensile strength.

---

The present application is a divisional application of my copending application Ser. No. 23,213, filed Mar. 27, 1970, now U.S. Pat. No. 3,702,356, entitled Process for Production of Glass-Filled Thermoplastic Pellets Suitable for Blending With Thermoplastic, which in turn is a continuation-in-part patent application of my patent application Ser. No. 833,983, filed June 17, 1969, now U.S. Pat. No. 3,608,033, entitled: Process for Production of Molding Compositions Containing High Weight Percent-of Glass. Ser. No. 84,444, a division of Ser. No. 833,983, has issued as U.S. Pat. No. 3.709,773, entitled Glass Reinforced Injection Molding Pellet.

The present invention is directed to a process for production of glass-filled thermoplastic pellets suitable for blending with thermoplastic, and to such pellets, and in particular, to a process which comprises feeding an extruded mixture of silane coupling agent, and molten thermoplastic resin (with or without glass fibers) to a cross-head die, coating continuous glass roving with said mixture in said cross-head die, solidifying said mixture while the same is coated on said roving, and subsequently pelletizing such product into pellets suitable for use by injection molders.

Glass-reinforced thermoplastic injection molding compounds have achieved widespread adoption. Conventionally, such material was sold in the form of cylindrical pellets containing glass fibers and/or roving disposed therein.

There has been a long-felt need for suitable glass-reinforced thermoplastic injection molding pellets, which can be mechanically blended, as by tumbling, with thermoplastic particles, with the resulting blend being used by the injection molder to form molded glass reinforced thermoplastic articles. Thus, it is most desirable from a cost standpoint for the molder making the glass-reinforced article to be able to blend thermoplastic with glass-reinforced thermoplastic material so as to achieve the desired weight percentage of glass in the molded article. Thus, it is significantly cheaper to blend four pellets of thermoplastic with a single pellet of glass-reinforced thermoplastic (with each of the pellets being of the same size), said glass-reinforced thermoplastic containing 80 weight percent glass, to yield a molded article containing 16 weight percent glass, than it is to use five pellets, each of which contains 16 weight percent glass. The use of a single pellet containing 80 weight percent glass means that only one pellet out of five used by the molder need be glass-reinforced. Since there is a significant processing charge to forming glass-reinforced pellets, this charge is substantially reduced when the number of glass-reinforced pellets used by the molder is substantially reduced.

However, problems have been encountered in the usage of extruded thermoplastic injection molding pellets derived from roving (by "roving" is meant a plurality of glass fibers joined together in a strand), which pellets contain very high concentrations of glass, such as of the order of 61 to 90 weight percent with thermoplastic pellets in injection molding. The usage of such pellets together with thermoplastic pellets results in "fuzz-balling" from the break-up of the continuous roving during the initial mixing prior to injection molding. Such fuzz-balling results in an increase in the bulk density of the product, and makes the product difficult to handle.

Yet another serious problem resulting from the usage of such pellets together with thermoplastic pellets has been the loss in tensile strength in the final injection molded article.

Another approach that has resulted in an inferior product has been to coat a continuous roving of glass with a solution of the thermoplastic, and then to volatilize the solvent from the solution to yield a thin coating of the thermoplastic on the roving. The resulting material has not been altogether satisfactory because the extreme thinness of the thermoplastic coating renders it subject to breakage, peeling, and other mechanical destruction.

This invention has as an object the provision of a process for the production of glass-filled thermoplastic pellets, which can be tumbled or otherwise mechanically blended by agitation with thermoplastic particles, with the resulting blend being used to mold a glass-reinforced article possessing high tensile strength.

This invention has as another object the provision of glass-filled thermoplastic pellets which are capable of being blended with thermoplastic particles to yield a molding composition which can be used to mold a glass-reinforced article having high tensile strength.

Other objects will appear hereinafter.

These and other objects are accomplished by the process of my invention in which an extruded mixture of intimately blended silane coupling agent, and molten thermoplastic resin, with or without glass fibers, but preferably with glas fibers therewithin, is fed to a cross-head die. A continuous glass roving is introduced through the cross-head die and coated with said mixture. The so-coated roving is removed from the cross-head die, with the thermoplastic being solidified by cooling, and the product then cut into pellets, such as right cylinders having a diameter of between $\frac{3}{32}$ inch and $\frac{1}{4}$ inch, and a height of $\frac{1}{8}$ inch to $\frac{1}{2}$ inch.

The glass-reinforced molding compositions of the present invention which are suitable for blending with thermoplastic particles to yield molded injection articles having a high tensile strength comprise the aforesaid pellets having a longitudinal axial core of continuous glass roving coated with an intimate mixture of silane coupling agent and thermoplastic, and preferably, also including glass fibers.

For the purpose of illustrating the invention there is shown in the drawings a form which is presently preferred; it being understood, however, that this invention is not limited to the precise arrangements and instrumentalities shown.

Referring to the drawings wherein like reference characters refer to like parts:

FIG. 1 is a longitudinal sectional view of a cross-head die used in conjunction with the process of the present invention.

FIG. 2 is a perspective view of a glass-reinforced thermoplastic injection molding pellet of the present invention.

FIG. 3 is a longitudinal sectional view of the product from the cross-head die shown in FIG. 1, after such product has left the forming die, taken on line 3—3 of FIG. 2.

FIG. 4 is a cross-sectional view taken on line 4—4 on FIG. 3.

In the subject invention, silane coupling agent is intimately blended with molten thermoplastic and glass fibers in an extruder. The concentration of silane coupling agent should be such as to produce a weight percentage of between 0.25 to 4.0 weight percent in the glass-filled thermoplastic pellets of the present invention which are suitable for blending with thermoplastic particles (over and above any silane coupling agent which is present in the sizing on the glass fibers).

A wide variety of silane coupling agents are known, and these materials have been adequately described in the technical literature and are recognized as such, as for example in Whittington's, *Dictionary of Plastics*, Technomic Publishing Co., Inc., 1968, page 218, and *Modern Plastics Encyclopedia*, 1967 (September 1966/Volume 44, No. 1A), pages 416 et seq., article by S. Sterman and J. G. Marsden, Silane Coupling Agents. Examples of suitable silane coupling agents which may be used with thermoplastics include:

vinyltriethoxysilane;
gamma-methacryloxypropyltrimethoxysilane;
beta-(3,4 epoxycyclohexyl)-ethyltrimethoxysilane;
gamma-glycidoxypropyltrimethoxysilane;
N-beta-(aminoethyl)-gamma-aminopropyltrimethoxysilane;
bis(beta-hydroxyethyl)-gamma-aminopropyltriethoxysilane;
gamma-chloropropyltrimethoxysilane; and
gamma-mercaptopropyltrimethoxysilane.

Any suitable silane coupling agent which can be used for thermoplastics may be used in the subject invention, and no inventive claim is made to any particular silane coupling agent. The following general characterization embraces most, but not all, of the silane coupling agents which may be used for thermoplastics:

$$(CH_3)_w X_{3-w} Si(CH_2)_n Y$$

where X is a hydrolyzable group, generally an ester
—$O(CH_2)_n H$;
where $n$ is 1 to 3;
where Y is an organofunctional group selected for compatability with a given resin, general classes are:

epoxide ethers  $OCH_2CHCH_2O$ 

amines  $NH_2$, $NHCH_3$, $NHCH_2CH_2NH_2$ epoxides  $CH_2CHCH_2O$ 

halogens  Cl, Br olefins  $CH=CH_2$

W is from 1 to 3, the number of methyl group substitutions

While the glass-filled thermoplastic pellets of the subject invention which are suitable for blending with thermoplastic particles have maximum utility when they contain very high weight percentages of glass such as 61 to 90 weight percent, the concentration of glass within such pellets may be varied over the very broad range of from 1 to 90 weight percent. Thus, the concentration of glass within such pellets will depend upon the amount of glass which is desired in the injection molded product, and will be a function of the amount of thermoplastic particles that will be blended with the pellets by the injection molder.

Referring to the drawings, and initially to FIG. 1;

The cross-head die is designated generally as 10. It includes a die body 12 and a forming die 14. A mandrel 16 is disposed within the bore of the body 12 and the forming die 14. The mandrel 16 is provided with a bore through which the continuous roving 18 extends. Such continuous roving 18 may be fed from a feeder roll (not shown) or other source. The mandrel 16 includes a deflector sleeve 20 and a tip 22, with the tip 22 extending within the bore of the forming die portion 14 of the cross-head die 10.

The die body 12 includes an inlet 24 which is in communication with the discharge of an extruder (not shown). The extruder discharges molten thermoplastic containing silane coupling agent and dispersed glass fibers into the bore 26 of the inlet 24 of die body 12. The present invention also includes the extrusion of only molten thermoplastic containing silane coupling agent to bore 26.

The amount of silane coupling agent disposed within the molten thermoplastic should be sufficient to give between 0.25 to 4.0 weight percent of dispersed silane coupling agent in the glass-filled thermoplastic pellets,[1] such as those shown in FIG. 2. As above-indicated, the amount of glass fibers can be varied over a very broad range so as to yield a total glass concentration of between 1 to 90 weight percent in the glass-filled thermoplastic pellets shown in FIG. 2; although, the invention has maximum utility for high concentrations of glass, such as about 61 to 90 weight percent total glass in the pellets.

The die body 12 may include heating means (not shown) for maintaining the thermoplastic in the molten state. However, in many cases, the thermoplastic will have been heated to such a degree that it will remain molten within the cross-head die without the need for heating means in the cross-head die.

The bore 26 is in communication with the bore 28 within which the mandrel 16 and its tip 22 are disposed.

The deflector sleeve 20 of the mandrel 16 prevents molten thermoplastic silane coupling agent and glass fibers from entering the posterior portion of the die body 12 (shown in the left portion of FIG. 1).

The continuous roving 18 is guided within the bore of the mandrel 16 and emerges from the tip 22 of the mandrel 16 into the bore 28 of the forming die 14.

Within the bore 28 such continuous roving from the tip 22 becomes coated with the uniformly dispersed silane coupling agent and molten thermoplastic containing dispersed glass fibers and the so-coated roving is removed from the forming die 14. This removal may be accomplished by a take-up roll (not shown) or by pinch roll means, such as pinch roll means (not shown) associated with a chopper which cuts the so-coated continuous roving into right cylinders of the desired length. The feed roll, take-up roll, chopper, and pinch roll means are conventional equipment presently used in conjunction with the manufacture of cylinders of thermoplastic injection molding polymers.

FIG. 3 is a longitudinal section showing the coated continuous roving as the same exists when it leaves the forming die 14.

The continuous roving 18 may be formed from one or more strands of continuous roving. Preferably, the continuous roving should have a length of between about 100 to 4000 yards per pound of roving. The roving should be Type E glass, preferably in diameters running from 0.0002 to 0.0006 inches. Normally, either G glass fibers having a diameter of 0.00037 inches or K fibers having a diameter of 0.00051 inches may be used.

A wide variety of suitable sizings are available, and the selection of a sizing forms no part of the present invention. The sizings vary depending upon the specific thermoplastic that is used. By way of example, a suitable commercial sizing may be a three component system and includes a silane coupling agent; a lubricant to prevent chafing (namely to prevent the degradation of glass fibers by mechanical contact with each other); and a ---
[1] Any silane coupling agent originally present in the size of glass is not included.

cementitious material such as polyvinyl alcohol or other commercial water-soluble film former.

I have found that it is essential for the purposes of my invention that the silane coupling agent be uniformly dispersed in the molten thermoplastic from the extruder discharged into the bore 26 of the inlet 24 of die body 12. Thus, I have added the same weight percentage of silane coupling agent as a coating to the continuous roving 18, and the resultant glass-filled thermopastic pellets, when blended with thermoplastic particles and subsequently molded by injecting molding, yielded an article having a much lower tensile strength than when the process of the present invention was used with the silane coupling agent dispersed within the molten thermoplastic.

I cannot explain the reason for the marked increase in tensile strength obtained in an injection molded article prepared from pellets made in accordance with the present invention, which were blended with thermoplastic particles, as opposed to pellets of identical chemical composition but where the silane coupling agent was carried on the roving (and with such pellets being blended with identical thermoplastic particles).

Accordingly, I do not wish to be bound by any theory as to why the unexpected results are achieved by the present invention. However, at the present time, I believe that possibly there are at least the following factors which account for this: (a) if the roving carries all of the silane coupling agent (other than the silane coupling agent present in the sizing on the glass fibers), there is interference with the wetting, chemical bonding, or other available physiochemical mechanism which accounts for resincoupling agent bonding; and (b) the presence of large amounts of silane coupling agent on the roving produces physical absorption layers which are not available to the thermoplastic for bonding purposes; and (c) there is an interference with the dispersion of the glass fibers.

As seen in FIGS. 3 and 4, the continuous roving 18 is surrounded by a coating of the thermoplastic polymer 30 containing dispersed glass fibers 32 and silane coupling agent.

The solidification of the molten thermoplastic portion 30 containing the silane coupling agent of the coating for the continuous roving 18 is readily accomplished by cooling in air after the same has left the forming die 14.

As seen particularly in FIG. 4, the thermoplastic portion 30 containing the silane coupling agent occupies the voids and spaces about the continuous roving 18. The glass fibers 32 in the thermoplastic 30 containing the silane coupling agent are dispersed substantially randomly in the coating.

The feed to the extruder in advance of the cross-head die may include either a mixture of glass fibers (such as chopped rovings), silane coupling agent, and thermoplastic pellets, or a mixture of thermoplastic pellets containing dispersed glass fibers therewithin, and silane coupling agent.

Since the combined polymer and dispersed glass coating, which embraces the roving, is stiff and harder than conventional polymer coatings, the pellets containing a high percentage of glass do not break apart upon tumbling to produce fuzz balls. Moreover, the glass fibers dispersed within the thermoplastic coating are not subject to fuzzballing.

FIG. 2 reveals a perspective view of a pellet of the present invention. As seen in FIG. 2, such pellet is a right cylinder. The right cylinder should have a diameter of $3/32$ inch to $1/4$ inch and a height of $1/8$ inch to $1/2$ inch. Such size pellets may be satisfactorily handled in commercial molding equipment.

As heretofore indicated, a plurality of continuous rovings may be used as the core. In the illustrated embodiment, three such rovings are utilized.

The subject invention is applicable to all thermoplastics which may be used to manufacture glass-reinforced injection molded articles. By way of example, the same include the nylon polyamides, such as nylon 6, nylon 11, nylon 610, nylon 66, etc.; polystyrene and copolymers thereof such as styrene-acrylonitrile and ABS; polyolefins such as polyethylene, polypropylene, and polyisobutylene; polyarylates such as polycarbonates, polysulfones and polyphenylene oxide; acetals, polyurethanes, and polyvinylchloride.

By way of example, and not by way of limitation, the following examples serve to illustrate the subject invention:

EXAMPLE 1

To glass fortified polypropylene pellets containing 20 weight percent glass fibers designated MF1004 whose physical properties are detailed in Liquid Nitrogen Processing Corporation Product Data Bulletin 209–1067 is added the silane coupling agent, gammaglycidoxypropyltrimethoxysilane $OCH_2CHCH_2O(CH_2)_3Si(OCH_3)_3$ designated Z–6040 and manufactured by Dow Corning, in amounts equal to $1\frac{1}{2}$ weight percent of MF1004. The pellets were tumbled in a drum in 50 pound lots on a drum tumbler to insure uniform dispersion. The Z–6040 MF1004 mix was extruded through a 2 inch Royle extruder into the cross-head shown in FIG. 1 onto continuous glass roving fed directly from a forming package and designated PPG 6532 obtained from Pittsburgh Plate Glass Co. Such continuous roving was formed of K fiber and was fed as two strands through a 0.125 inch die which resulted in a strand weighing 2.74 grams per foot running at 500 feet per minute. The resultant product was obtained containing 60 weight percent glass. During the run the extruder was operated at a barrel temperature of between 430–450° F., and heaters were maintained in the cross-head die so that such die was at a similar temperature. The extruder was operated at eight revolutions per minute.

A premix consisting of 50 weight percent of pellets of the concentrate prepared above and 50 weight percent of virgin polypropylene powder was injection molded into tensile specimens suitable for ASTM Tensile Test D638. The tensile strength of the specimens was observed to be 9,500 p.s.i. an opposed to 7,500 for a similarly prepared control without the Z–6040 silane coupling agent.

For the purposes of comparison, the identical procedure set forth in the first paragraph of this Example 1 was repeated except that all of the Z–6040 silane coupling agent was added as a coating on the continuous glass roving, and none of it was added in the extruded mixture of polypropylene and glass fibers. A premix consisting of 50 weight percent of pellets of the so-prepared concentrate and 50 weight percent of virgin polypropylene powder was injection molded into tensile specimens suitable for ASTM Tensile Test D638. The tensile strength of such specimens was observed to be only 7,900 p.s.i. as opposed to a 9,500 p.s.i. obtained when the procedure of the present invention was followed as set forth above.

EXAMPLE 2

The process of Example 1 was repeated, but with polypropylene pellets and chopped PPG 3129 ($1/4$ inch chopped strand, type E glass, K fiber, obtained from Pittsburgh Plate Glass Co.) being employed instead of MF1004. The Z–6040 is added directly to a premix of the above before tumbling. Tensile results were identical with those of Example 1.

EXAMPLE 3

The process of Example 2 was repeated with the Z–6040 added first to the PPG 3129 chopped glass and then premixed with the polypropylene. Comparable results were obtained to those of Example 1.

EXAMPLE 4

The process of Example 2 was repeated with the Z–6040 silane added first to the polypropylene pellets and then premixed with the chopped PPG 3129 glass. Comparable results were obtained to those of Example 1.

EXAMPLE 5

The process of Example 1 was repeated but with gammamethacryloxypropyltrimethoxysilane in place of the gamma-glycidoxypropyltrimethoxysilane. Tensile properties were observed at 9,000 p.s.i. versus 7,500 p.s.i. for the control without silane coupling agent using ASTM D638.

EXAMPLE 6

To glass fortified polysulfone pellets containing 30 weight percent glass fibers designated GF1006 whose physical properties are detailed in Liquid Nitrogen Processing Corporation Product Data Bulletin 206-1167 is added the silane coupling agent Y-2967, a silane ester comprising bis (beta-hydroxy-ethyl) - gamma - aminopropyltriethoxysilane manufactured by Union Carbide, in amount equal to 2.0 weight percent of the GF1006. This is dispersed uniformly by drum trumbling. The mixture was extruded using the cross-head die over 22 strands of K fiber glass continuous roving weighing 0.094 grams per foot. The result was a product containing 76% glass. Physical properties obtained with a 30 weight percent glass fiber ASTM D638 molding showed a final tensile strength of 20,000 p.s.i. as opposed to 17,000 p.s.i. for an ASTM D638 molding without the silane coupling agent.

EXAMPLE 7

Polypropylene containing one weight percent of uniformly dispersed Z-6040 was extruded onto continuous glass roving consisting of forty-eight glass fibers and weighing 0.045 grams per linear foot. The final product contained 40 weight percent glass fibers. Tensile strength of this material directly molded into ASTM D638 specimens was 10,400 p.s.i. as opposed to 8,000 p.s.i. for the untreated control. In Example 7, it is to be noted that only the thermoplastic and the silane coupling agent were extruded onto the glass roving. In its broader aspects, my invention contemplates the addition of molten thermoplastic having uniformly dispersed silane coupling agent onto glass roving, although in its preferred embodiments glass fibers are dispersed throughout such molten thermoplastic.

Virtually all commercially available continuous glass roving and glass fibers are sized and generally contain between 0.1 to 1.5 weight percent of silane coupling agent (based on the total weight of roving plus its size or the glass fibers and their size). Such silane coupling agents, which is present in the size, is not referred to in the accompanying claim.

The present invention may be embodied in other specific forms without departing from the spirit or essential attributes thereof and, accordingly, reference should be made to the appended claim, rather than to the foregoing specification as indicating the scope of the invention.

I claim:

1. A glass-reinforced injection molding pellet consisting essentialy of a right cylinder having a height of ⅛ inch to ½ inch and a diameter of 5/32 inch to ¼ inch, said cylinder having a longitudinal axial core of continuous glass roving coated with a mixture of thermoplasticpolymer having uniformly dispersed therewithin glass fibers and silane coupling agent, with the concentration of the silane coupling agent exclusive of any silane coupling agent present in the glass sizing being between 0.25 and 4.0 weight percent, and the concentration of the glass in the total pellet being from about 61 to 90 weight percent.

References Cited

UNITED STATES PATENTS

| | | | |
|---|---|---|---|
| 3,709,773 | 1/1973 | Hall | 161—170 |
| 3,287,204 | 11/1966 | Marzocchi | 161—206 |
| 3,537,948 | 11/1970 | Marzocchi | 161—193 |
| 3,472,729 | 10/1969 | Sterman et al. | 161—193 |
| 3,705,125 | 12/1972 | Preston et al. | 161—170 |
| 3,467,634 | 9/1969 | Jacknow et al. | 161—203 |
| 3,671,384 | 6/1972 | Baer et al. | 161—170 |
| 3,705,075 | 12/1972 | Marzocchi | 161—176 |
| 3,676,287 | 7/1972 | Flautt et al. | 161—176 |

GEORGE F. LESMES, Primary Examiner

W. R. DIXON, JR., Assistant Examiner

U.S. Cl. X.R.

117—4, 126; 161—170, 193, 208